United States Patent [19]
Haase et al.

[11] Patent Number: 5,165,105
[45] Date of Patent: Nov. 17, 1992

[54] SEPARATE CONFINEMENT ELECTROABSORPTION MODULATOR UTILIZING THE FRANZ-KELDYSH EFFECT

[75] Inventors: Michael A. Haase, Woodbury; David K. Misemer, Maplewood, both of Minn.

[73] Assignee: Minnesota Minning and Manufacturing Company, St. Paul, Minn.

[21] Appl. No.: 739,870

[22] Filed: Aug. 2, 1991

[51] Int. Cl.$^5$ .......................... G02B 6/10; G02F 1/17
[52] U.S. Cl. ........................................ 385/8; 385/2; 385/131
[58] Field of Search ................ 385/1, 2, 8, 131, 130, 385/30

[56] References Cited

U.S. PATENT DOCUMENTS

| | | | |
|---|---|---|---|
| 3,791,717 | 2/1974 | Honda | 350/160 |
| 3,854,795 | 12/1974 | Honda | 350/160 |
| 4,525,687 | 6/1985 | Chemla et al. | 332/7.51 |
| 4,793,677 | 12/1988 | Adams et al. | 350/96.14 |
| 4,802,182 | 1/1989 | Thornton et al. | 372/50 |
| 4,837,526 | 6/1989 | Suzuki et al. | 332/7.51 |
| 5,013,113 | 5/1991 | Soref | 385/17 |
| 5,048,907 | 9/1991 | Wickman et al. | 385/2 |
| 5,091,980 | 2/1992 | Ogawa et al. | 385/131 |

OTHER PUBLICATIONS

Wood et al., "131 ps Optical Modulation in Semiconductor Multiple Quantum Wells (MQW's)", J. of Quant. Eltrnics pp. 117-118, 1985.

"Limits of Electro-absorption in High Purity GaAs, and the Optimisation of Waveguide Devices", Wight et al, IEE Proceedings Article; vol. 135, pp. 39-44, Feb. 1988.

"Separate-Confinement Broad-Area Lasers," Casey and Panish Book entitled Heterostructure Lasers, pp. 197-199.

Primary Examiner—John D. Lee
Assistant Examiner—S. W. Barns
Attorney, Agent, or Firm—Gary L. Griswold; Walter N. Kirn; Walter C. Linder

[57] ABSTRACT

A semiconductor heterojunction, guided-wave, electroabsorption modulator. The device includes a rib waveguide fabricated on a substrate. The waveguide includes a relatively thin and off-center undoped electroabsorbing layer within a light-guiding region. Electrodes configured for interconnection to an external voltage source produce an electric field within the waveguide. Heavily doped field confining layers on opposite sides of the electroabsorbing layer confine the electric field within the electroabsorbing layer to cause the electroabsorption of radiation in accordance with the Franz-Keldysh effect.

30 Claims, 2 Drawing Sheets

SEPARATE CONFINEMENT ELECTROABSORPTION MODULATOR UTILIZING THE FRANZ-KELDYSH EFFECT

FIELD OF THE INVENTION

The present invention relates generally to semiconductor light modulating devices. In particular, the present invention is a guided-wave electroabsorption modulator of the type utilizing the Franz-Keldysh effect to absorb light propagating through the device.

BACKGROUND OF THE INVENTION

Electroabsorption modulators are generally known. These devices can be fabricated in several compound semiconductor systems (e.g., AlGaAs), and typically include a heterojunction waveguide on a substrate. A modulated bias voltage is applied to the device through electrode contacts to reverse bias the pn junction and set up an electric field within the waveguide. The band gap energy of the waveguide semiconductor material is greater than the photon energy of the light to be modulated. Incident light therefore propagates through the device in the absence of the applied bias voltage. However, the electric field produced by the bias voltage causes an increase in the absorption coefficient in accordance with the Franz-Keldysh effect. Light propagating through the waveguide is therefore modulated by applying a modulated bias voltage to the device.

A number of competing factors must be optimized to produce practical electroabsorption modulators. Insertion losses, including both losses within the waveguide at zero applied bias (i.e., zero-bias absorption) and coupling losses, must be low. This factor limits how close the semiconductor band gap energy can be to the photon energy of the light to be modulated, since zero-bias absorption increases for photon energies near the edge.

The extinction ratio (i.e., the amount of light absorbed when bias voltage is applied) should be large. Franz-Keldysh absorption is greatest when the waveguide semiconductor band gap edge is just beyond the photon energy of the light to be absorbed. The band gap of the waveguide semiconductor must therefore be selected as a compromise for both low insertion loss and high extinction ratio.

Operating voltage should be minimized to limit the amount of heat dissipated by the device. The absorbed light generates photocurrent within the device. This photocurrent is multiplied by impact ionization caused by the electric field, further increasing the power which must be dissipated.

Known electroabsorption modulators typically have a relatively thick undoped waveguide region (1-2 $\mu$m) across which the electric field is distributed. These devices require relatively high modulating bias voltages (50-100 V) to achieve the high electric fields (0.5 mv/cm) needed for strong electroabsorption. Since the absorbed light generates photocurrent, the efficiency of these devices is relatively low (2-4%). Decreasing the difference between the photon energy of the light and the band gap edge of the semiconductor (e.g., to a difference of less than 80 meV) to increase electroabsorption is not practical due to the increased zero-bias loss.

It is evident that there is a continuing need for improved electroabsorption modulators. A low power, low insertion loss and high extinction ratio modulator of this type for visible laser light would have widespread application. To be commercially viable, the device must also be efficient to manufacture.

SUMMARY OF THE INVENTION

This invention is an improved electroabsorption modulator of the type utilizing the Franz-Keldysh effect to modulate radiation. The modulator includes a semiconductor waveguide with a light-guiding region for propagating the radiation, and electrodes configured for interconnection to an external voltage source to produce an electric field within the waveguide. An active region within the light-guiding region has a thickness which is less than the thickness of the light-guiding region, and includes an electroabsorbing layer and field confining structure. The field-confining structure confines the electric field within the absorbing layer to cause the absorption of radiation in accordance with the Franz-Keldysh effect. Since electroabsorption occurs within the active region, the light-guiding region of the waveguide can be configured for low insertion losses.

In preferred embodiments the modulator is a heterojunction, AlGaAs device. The field confining structure includes two highly doped semiconductor layers, each of which is positioned on opposite sides of the absorbing layer. The absorbing layer is an undoped or more lightly doped layer of semiconductor located at an off-center position within the light-guiding region.

DESCRIPTION OF THE PREFERRED EMBODIMENTS

Figure 1:
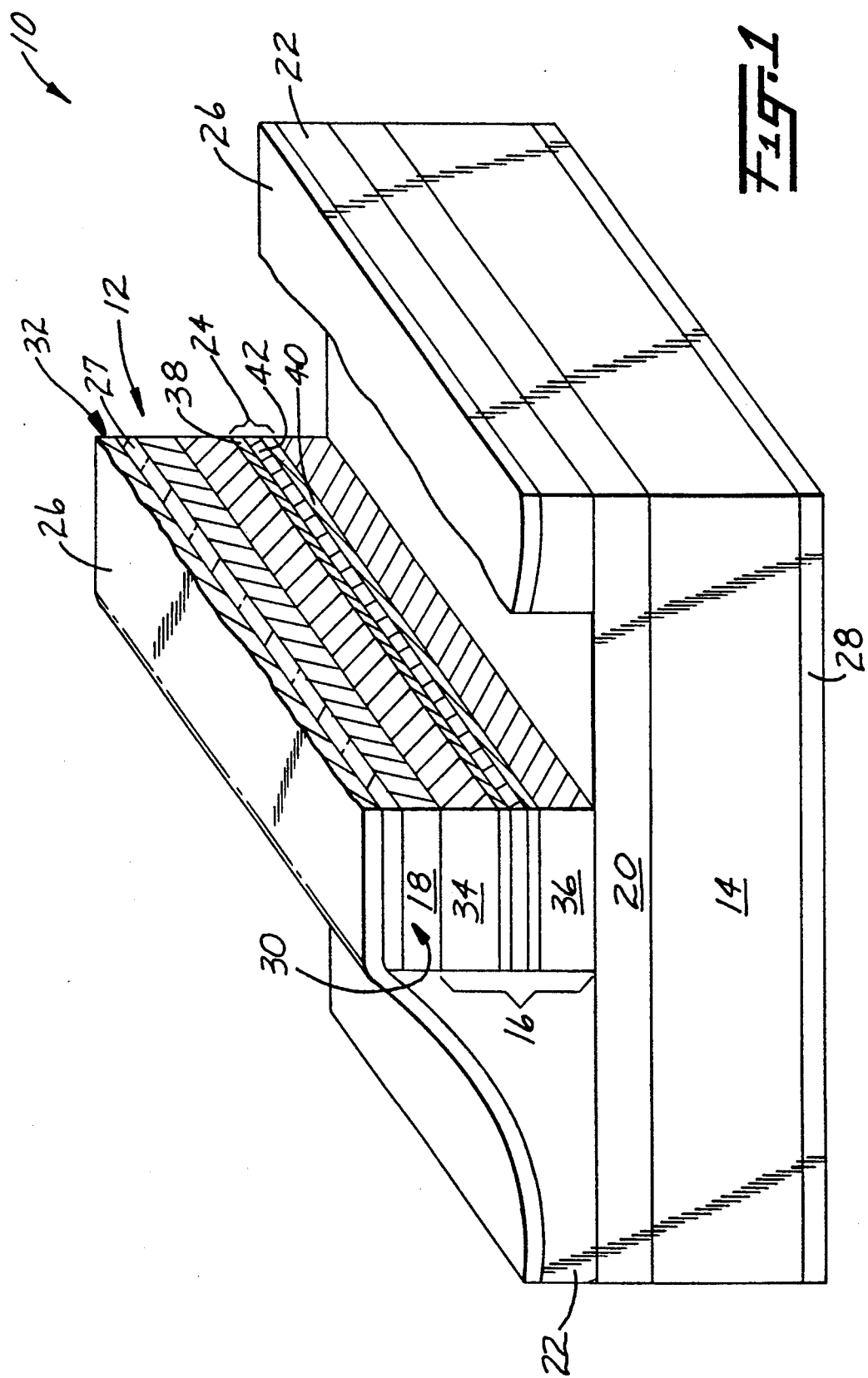
FIG. 1 is a cross sectional perspective view of an electroabsorption modulator in accordance with the present invention.

A guided-wave separate confinement electroabsorption modulator 10 in accordance with the present invention is illustrated generally in FIG. 1. Electroabsorption modulator 10 includes a rib waveguide 12 fabricated on a substrate 14. Waveguide 12 includes a passive light-guiding region 16 which has its top and bottom surfaces bounded by upper cladding layer 18 and lower cladding layer 20, respectively. The sides of both light-guiding region 16 and upper cladding layer 18 are covered by insulating material 22. An active region 24 is positioned within passive light-guiding region 16. In the embodiment shown, light-guiding region 16 includes an upper light-guiding layer 34 and a lower light-guiding layer 36 which are separated by active region 24. Active region 24 includes upper and lower field-confining layers 38 and 40, respectively, which are positioned on opposite sides of an electroabsorbing layer 42. Electrical contact to the upper portion of waveguide 12 is made through upper electrode 26 and ohmic contact layer 27 on upper cladding layer 18 opposite light-guiding region 16, while lower ohmic contact electrode 28 is positioned on the surface of substrate 14 opposite waveguide 12.

An incident light beam applied to first end face 30 of electroabsorption modulator 10 will emerge as an output beam from second end face 32. A modulating bias voltage is applied to electrodes 26 and 28 from an external source to set up an electric field within absorbing layer 42, and modulate the incident beam in accordance with the Franz-Keldysh effect as the beam propagates through waveguide 12. The electric field is substantially confined and concentrated (i.e., separately confined) within the absorbing layer 42 of the light-guiding region 16. The term "substantially" is used to characterize this confinement effect because although the electric field strength has a narrow distribution centered at absorbing layer 42, it does extend into layers 38 and 40. Because of the superlinear dependance of Franz-Keldysh absorption with increasing field strength, modulator 10 enables strong electroabsorption with low bias voltages. Active region 24 is also relatively thin, enabling remaining portions of light-guiding region 16 to be configured for low insertion loss and low free carrier absorption.

Electroabsorption modulator 10 can be fabricated in any desired heterostructure semiconductor material system appropriate for the photon energy of the light to be modulated. The band gap of electroabsorbing layer 42 is preferably in the range of 20 meV to 200 meV greater than the photon energy of the light being modulated. Group III-V compound semiconductors such as GaAs-$Al_xGa_{1-x}$As, InP-$Al_xGa_yIn_{1-x-y}$As and InP-$Ga_xIn_{1-x}As_yP_{1-y}$ can, for example, be used to fabricate electroabsorption modulators 10 configured for wavelengths in the 600 nm to 1600 nm range. In particular, a modulator 10 for light of wavelengths between 633 nm and 950 nm can be fabricated from $Al_xGa_{1-x}$As. A modulator 10 fabricated from GaInAsP or AlGaInAs-InP can be used to modulate light with wavelengths between 1000 nm and 1600 nm. An AlGaAs-GaAs modulator 10 fabricated with an InGaAs absorbing layer 42 can modulate light with a 1300 nm wavelength. Electroabsorption modulator 10 can also be fabricated from Group II-VI compound semiconductors such as $ZnS_ySe_{1-y}$, $Cd_xZn_{1-x}$S or ZnSe to modulate light at even shorter wavelengths.

Figure 2:
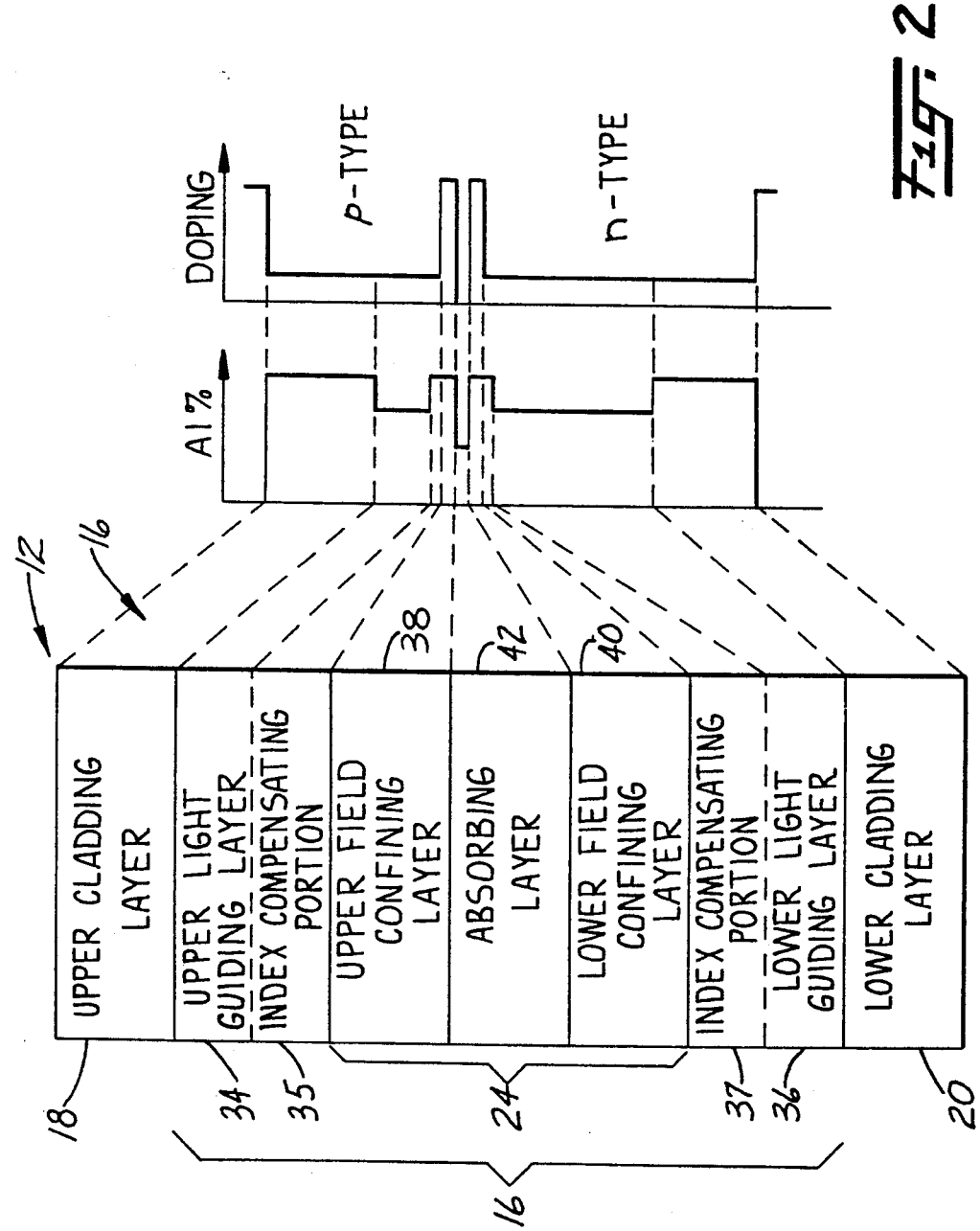
FIG. 2 is a diagrammatic representation of the relative aluminum content and doping profiles for the layers of the electroabsorption modulator shown in FIG. 1.

The electroabsorption modulator 10 described in detail in Table I below is fabricated from $Al_xGa_{1-x}$As-GaAs semiconductor material to modulate visible light generated by He-Ne lasers operating at 633 nm. To form a pn junction and keep current flow to a minimum, upper cladding layer 18, upper light guiding layer 34 and upper field confining layer 38 are of the opposite carrier type as that of corresponding lower layers 20, 36, and 40. Absorbing layer 42 is undoped in this embodiment. The relative percentages of aluminum and doping profiles for layers 18, 34, 38, 42, 40, 36 and 20 are illustrated generally in FIG. 2.

To minimize zero-bias absorption, it is preferable for absorbing layer 42 to have a smaller band gap than the band gaps of layers 34, 36, 38 and 40. This will also result in a change in the refractive index profile of the waveguide 12 and therefore a perturbation of the optical modes, potentially reducing coupling efficiency. To compensate for this effect, field-confining layers 38 and 40 and/or index compensating portions 35 and 37 of light-guiding layers 34 and 36, respectively, can have a larger band gaps and lower indices of refraction than absorbing layer 42. In particular, the indices of refraction of layers 38 and 40, absorbing layer 42 and compensating portions 35 amd 37, when averaged over the associated thicknesses, should equal the index of refraction of the non-compensating portions of light-guiding layers 34 and 36. In the embodiment shown in FIG. 2, the percentages of aluminum of layers 18, 20, 34, 36, 38, 40 and 42 are used to control the refractive index profile.

TABLE 1

| Electroabsorption Modulator Element | Material | Thickness | Doping (cm$^{-3}$) |
|---|---|---|---|
| Upper Electrode 26 | Au on Ti on | 200 nm 50 nm | |
| Ohmic Contact Layer 27 | GaAs | 150 nm | p = 1 × 10$^{19}$ |
| Upper Cladding Layer 18 | $Al_{.65}Ga_{.35}$As | 1000 nm | p = 1 × 10$^{17}$ |
| Upper Light Guiding Layer 34 | $Al_{.55}Ga_{.45}$As | 350 nm | p = 3 × 10$^{16}$ |
| Upper Field Confining Layer 38 | $Al_{.55}Ga_{.45}$As | 70 nm | p = 1 × 10$^{18}$ |
| Absorbing Layer 42 | $Al_{.50}Ga_{.50}$As | 100 nm | Undoped |
| Lower Field Confining Layer 40 | $Al_{.55}Ga_{.45}$As | 70 nm | n = 1 × 10$^{18}$ |
| Lower Light Guiding Layer 36 | $Al_{.55}Ga_{.45}$As | 1650 nm | n = 3 × 10$^{16}$ |
| Lower Cladding Layer 20 | $Al_{.65}Ga_{.35}$As | 1000 nm | n = 1 × 10$^{17}$ |
| Substrate 14 | GaAs | .35 nm | n = 1 × 10$^{18}$ |
| Lower Electrode 28 | Au—Ge alloy with 12% Ge | 150 nm | |

For a given modulation bias voltage, the strength of Franz-Keldysh effect electroabsorption increases with decreasing thickness of absorbing layer 42. However, the junction capacitance of modulator 10 increases with decreasing thickness of absorbing layer 42, thereby reducing the maximum useful frequency of the device. The 100 nm thickness of absorbing layer 42 in the embodiment described above was selected as a compromise between these competing thickness related properties.

The band gap of absorbing layer 42 is also selected to compromise two competing properties, zero-bias absorption and strength of absorption. In the embodiment of modulator 10 described above, absorbing layer 42 has a direct band gap of 2.08 eV, a value slightly lower than the 2.16 eV direct band gap of light-guiding layers 34 and 36. This band gap of absorbing layer 42 is 120 meV greater than the 1.96 eV photon energy of light emitted from the He-Ne laser.

Confinement of the E field within absorbing layer 42 is achieved by the heavily doped p+ and n+ confining layers 38 and 40, respectively. The doping of these layers is just high enough that they are almost depleted of carriers at the reverse breakdown voltage of the device. This doping profile assures that a sufficient number of charged impurities are present to provide good confinement of the electric field, while minimizing the number of free carriers at zero bias (and associated free carrier absorption). The other layers 18, 34, 36 and 20 of light guiding region 16 need therefore be doped only high enough to provide the conductivity required to achieve the desired bandwidth of modulator 10. A modulator 10 with the doping densities described above is configured for a 2 GHz bandwidth.

Depending on the thicknesses of light-guiding layers 34 and 36 and the difference in the refractive indices between the light-guiding layers and cladding layers 18 and 20, waveguide 12 can support more than one mode of light propagation. In fact, to achieve acceptably high coupling to optical fibers and focused light beams, waveguide 12 should be relatively thick, and therefore multimode, when operating at visible wavelengths. Coupling misalignment and mode conversion due to interface roughness can also cause light to be scattered into higher order modes, even if only the zeroeth-order mode is stimulated by the incident light. Since active region 24 has a thickness which is a relatively small portion of the overall thickness of waveguide 12, it is critical to place the active region at a location which will optimize the extinction for all guided modes. For example, if absorbing layer 42 is positioned in the center of waveguide 12 (i.e., if light-guiding layers 34 and 36 had the same thickness), the first order mode would be poorly absorbed since it has a node at the absorbing layer. The embodiment of modulator 10 described above in which lower light-guiding layer 36 has a thickness 4.7 times as great as the thickness of upper light-guiding layer 34 is the result of computer modeling which shows this relative positioning of absorbing layer 42 to be optimum for the first four modes of light propagation.

Electroabsorption modulator 10 can be fabricated from a semiconductor wafer (not shown) including layers 27, 18, 34, 38, 42, 40, 36, 20 and 14. This wafer can be manufactured by any technique appropriate for the particular semiconductor material system in which the device is being fabricated. By way of example, these layers can be grown by epitaxial means such as liquid-phase epitaxy, vapor-phase epitaxy or molecular beam epitaxy. The structure of rib waveguide 12 can be produced by removing undesired portions of the wafer layers by chemical etching or plasma etching. The etch depth should be at least as deep as active region 24, to define the junction area. Alternatively, waveguide 12 can be formed as a channel waveguide by growing the semiconductor layers of the device in a preformed groove in substrate 14, or by proton bombardment. In the embodiment of modulator 10 described above, waveguide 12 is approximately 2 $\mu$m in height and 5 $\mu$m in width.

Electrical contact to the exposed upper surface of waveguide 12 can be facilitated by covering the upper surface of the wafer with an insulating layer 22 of material such as $SiO_2$, $Si_3N_4$ or polyimide. Openings in insulating layer 22 can be formed photolithographically to enable the subsequently deposited electrode layer 26 to make contact with the semiconductor material (layer 27) only on waveguide 12. Vacuum evaporation, sputtering or electroplating techniques can be used to deposit electrode layer 26 on contact layer 27 of waveguide 12. In one embodiment, a 0.3 $\mu$m layer of sputtered $SiO_2$ was applied as an insulating layer, with the Ti and Au of electrode layer 26 deposited by vacuum evaporation. The Ti provides good adhesion to the $SiO_2$ and contact layer 27.

Electroabsorption modulator 10 is preferably cleaved to its desired length to provide optically perfect end faces 30 and 32. Alternatively, faces 30 and 32 can be formed by etching. Insertion losses associated with the application of an input beam to face 30 are dominated by coupling losses. These coupling losses can be reduced by the application of antireflective (AR) coatings (not shown) to input face 30 and output face 32. Evaporated SiO can be used as the AR coatings to increase the coupling efficiency by a factor of two (without coatings, R=0.3 at each face 30 and 32). Coupling efficiency can also be enhanced by properly matching the numerical aperture of the input beam to that of the waveguide face 30.

Prototypes of the embodiment of electroabsorption modulator 10 described above and having a length of 1420 $\mu$m have been fabricated by MBE. When operated at 633 nm, the 1420 $\mu$m modulator 10 exhibited an extinction ratio in excess of 100:1 (20 dB) at an operating voltage of 10 V. Experiments with modulators 10 having absorbing region 24 in the center of the light guiding region, but otherwise identical, had significantly lower extinction ratios (typically about 25:1). The SiO AR coating increased the zero-bias transmission to about 33% (insertion loss of 5 dB) in experiments with microscope objective coupling.

In tests of the 1420 $\mu$m modulator 10 with an input beam of 250 $\mu$W of optical power, the absorption coefficient in the zero-bias transmitting state was less than 8 $cm^{-1}$, and increased to over 35 $cm^{-1}$ in the absorbing state at 10 V applied bias. This modulator 10 exhibited an efficiency of over 10%. Total capacitance of this modulator 10 was 7 pF (the expected junction capacitance), implying a rise time of 0.8 nsec when driven by a 50 ohm system (2.2 $\times$ RC). This modulator 10 has been shown to operate at modulation frequencies over 18 MHz. Electroabsorption modulators 10 with narrower waveguides 12 would have a lower capacitance and could provide single mode operation. For example, it is expected that a modulator such as 10 with a 2 $\mu$m wide waveguide 12 would have a rise time of 130 psec, and a bandwidth of 2.6 GHz.

Electroabsorption modulators 10 in accordance with the present invention offer considerable advantages over those of the prior art. The devices can operate at 633 nm for He-Ne sources. Insertion losses, including both coupling losses and losses within the waveguide, are low. The field confining structure enables the device to have a high extinction ratio at low operating voltages while minimizing free carrier absorption. These devices also have these characteristics even if they support multiple optical modes.

Although the present invention has been described with reference to preferred embodiments, those skilled in the art will recognize that changes may be made in form and detail without departing from the spirit and scope of the invention.

What is claimed is:

1. A guided-wave electroabsorption modulator of the type utilizing the Franz-Keldysh effect to modulate radiation, comprising:

semiconductor waveguide including a light-guiding region having a thickness, for propagating radiation;

electrodes configured for interconnection to an external voltage source, for producing an electric field within the waveguide; and an active region within the light-guiding region and having a thickness which is less than the thickness of the light-guiding region, including:

an electroabsorbing layer; and field-confining structure for confining the electric field within the absorbing layer to cause the absorption of radiation in accordance with the Franz-Keldysh effect.

2. The electroabsorption modulator of claim 1 wherein the field-confining structure includes first and second field-confining layers of material, each layer on opposite sides of the electroabsorbing layer.

3. The electroabsorption modulator of claim 2 wherein the field-confining layers of material include layers of doped semiconductor.

4. The electroabsorption modulator of claim 3 wherein:
the first field-confining layer and a first portion of the light-guiding region on a first side of the electroabsorbing layer include a first conductivity type semiconductor; and
the second field-confining layer and a second portion of the light-guiding region on a second side of the electroabsorbing layer include a second conductivity type semiconductor.

5. The electroabsorption modulator of claim 4 wherein the waveguide further includes:
a first cladding layer of semiconductor of the first conductivity type adjacent to the first portion of the light-guiding region; and
a second cladding layer of semiconductor of the second conductivity type adjacent to the second portion of the light-guiding region.

6. The electroabsorption modulator of claim 5 wherein the modulator further includes a semiconductor substrate of the second conductivity type.

7. The electroabsorption modulator of claim 2 wherein:
the electroabsorbing layer includes a layer of semiconductor; and
the field-confining layers of material include layers of semiconductor.

8. The electroabsorption modulator of claim 7 wherein the electric field-confining semiconductor layers have a higher concentration of carriers than the electroabsorbing layer of semiconductor.

9. The electroabsorption modulator of claim 7 wherein the electroabsorbing layer includes an undoped semiconductor layer.

10. The electroabsorption modulator of claim 1 wherein the active region is positioned off-center within the light-guiding region.

11. The electroabsorption modulator of claim 1 wherein the modulator is a Group II-VI compound semiconductor device.

12. The electroabsorption modulator of claim 1 wherein the modulator is a Group III-V compound semiconductor device.

13. The electroabsorption modulator of claim 12 wherein the modulator is an $Al_xGa_{1-x}As$ device.

14. The electroabsorption modulator of claim 12 wherein the modulator is an $InP-Ga_xIn_{1-x}As_yP_{1-y}$ device.

15. The electroabsorption modulator of claim 12 wherein the modulator is an $InP-Al_xGa_yIn_{1-x-y}As$ device.

16. The electroabsorption modulator of claim 1 wherein:
the light-guiding region includes $Al_xGa_{1-x}As$ semiconductor; and
the absorbing layer includes a layer of $Ga_xIn_{1-x}As$ semiconductor.

17. The electroabsorption modulator of claim 1 wherein the modulator is configured for modulating light having a 633 nm wavelength.

18. A guided-wave Franz-Keldysh effect electroabsorption modulator including:
a substrate;
a lower cladding semiconductor layer over the substrate;
a lower light-guiding semiconductor layer over the lower cladding layer;
a lower electric field-confining material layer over the lower light-guiding layer;
an electroabsorbing semiconductor layer over the lower field confining layer;
an upper electric field-confining material layer over the electroabsorbing layer;
an upper light-guiding semiconductor layer over the upper field-confining layer;
an upper cladding semiconductor layer over the upper light-guiding layer; and
upper and lower electrode layers on opposite sides of the electroabsorbing layer.

19. The electroabsorption modulator of claim 18 wherein:
the substrate, lower cladding layer and lower light-guiding layer include semiconductor layers of a first conductivity type; and
the upper cladding layer and upper light-guiding layer include semiconductor layers of a second conductivity type.

20. The electroabsorption modulator of claim 19 wherein:
the lower field-confining layer includes a semiconductor layer of the first conductivity type; and
the upper field-confining layer includes a semiconductor layer of the second conductivity type.

21. The electroabsorption modulator of claim 20 wherein the lower and upper field-confining layers include semiconductor layers having a higher concentration of carriers than the lower and upper light-guiding layers.

22. The electroabsorption modulator of claim 21 wherein the absorbing layer includes a semiconductor layer having a lower concentration of carriers than the field-confining layers.

23. The electroabsorption modulator of claim 21 wherein one of the upper and lower light-guiding layers has a thickness greater than the other.

24. The electroabsorption modulator of claim 18 wherein the electroabsorbing layer includes an undoped semiconductor layer.

25. The electroabsorption modulator of claim 18 wherein one of the upper and lower light-guiding layers has a thickness greater than the other.

26. The electroabsorption modulator of claim 18 wherein the modulator is a Group II-VI compound semiconductor device.

27. The electroabsorption modulator of claim 18 wherein the modulator is a Group III-V compound semiconductor device.

28. The electroabsorption modulator of claim 27 wherein the modulator is an $Al_xGa_{1-x}As$ device.

29. The electroabsorption modulator of claim 27 wherein the modulator is an $InP-Ga_xIn_{1-x}As_yP_{1-y}$ device.

30. The electroabsorption modulator of claim 27 wherein the modulator is an $InP-Al_xGa_yIn_{1-x-y}As$ device.

* * * * *